US007288234B1

(12) United States Patent
Salan et al.

(10) Patent No.: US 7,288,234 B1
(45) Date of Patent: Oct. 30, 2007

(54) GLYCOLS AS AN ADJUVANT IN TREATING WASTES USING THE MOLTEN SALT OXIDATION PROCESS

(75) Inventors: Jerry S. Salan, Hughesville, MD (US); John R. Luense, Accokeek, MD (US); Jim R. Griffenhagen, Springfield, VA (US); Michael A. Lateulere, Marbury, MD (US)

(73) Assignee: Department of the Navy as represented by the Secretary of the Navy, Washington, DC (US)

( * ) Notice: Subject to any disclaimer, the term of this patent is extended or adjusted under 35 U.S.C. 154(b) by 455 days.

(21) Appl. No.: 10/373,017

(22) Filed: Feb. 26, 2003

(51) Int. Cl.
*B01D 53/14* (2006.01)

(52) U.S. Cl. ...................................................... 423/228

(58) Field of Classification Search ................ 588/312, 588/313, 314, 315, 318, 403, 410, 415
See application file for complete search history.

(56) References Cited

U.S. PATENT DOCUMENTS

| | | | | |
|---|---|---|---|---|
| 3,447,895 | A | 6/1969 | Nelson et al. | 23/48 |
| 3,642,583 | A | 2/1972 | Greenberg et al. | 203/11 |
| 3,708,270 | A | 1/1973 | Birk et al. | 48/202 |
| 4,032,615 | A | 6/1977 | Johnson | 423/179 |
| 4,036,900 | A | 7/1977 | Strangio | 260/659 |
| 4,071,571 | A | 1/1978 | Tsao | 260/654 |
| 4,106,978 | A | 8/1978 | Nelson | 162/1 |
| 4,194,124 | A | 3/1980 | Nutley et al. | 250/492 |
| 4,462,319 | A | 7/1984 | Larsen | 110/238 |
| 4,477,373 | A | 10/1984 | Grantham et al. | 252/626 |
| 5,348,689 | A | 9/1994 | Gay et al. | 588/18 |
| 6,436,358 | B1 * | 8/2002 | Hsu et al. | 423/11 |
| 6,489,532 | B1 * | 12/2002 | Brummond et al. | 588/314 |

* cited by examiner

*Primary Examiner*—Edward M. Johnson
(74) *Attorney, Agent, or Firm*—Frederick J. Zimmerman

(57) ABSTRACT

An improved system and method for using polyethylene glycol (PEG) as a processing fluid additive for safely and effectively treating water-wet hogout propellant as well as any other water-wet propellants, explosives and hazardous wastes (solids and liquids) to make them compatible with the MSO process. The method includes the step of applying liquid PEG to the hazardous waste to create a slurry or feedstock that when fed directly into the MSO reactor vessel prevents the occurrence of smelt-water explosions due to the accumulation of dangerous levels of sodium chloride, and/or sodium sulfide in the molten salt bath. The PEG possesses special qualities that make it ideal for this purpose. It is a low cost, low viscosity, commercially available, non-hazardous (per OSHA standards), water soluble, low toxicity chemical that burns cleanly leaving little or no residue.

18 Claims, 2 Drawing Sheets

GLYCOLS AS AN ADJUVANT IN TREATING WASTES USING THE MOLTEN SALT OXIDATION PROCESS

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention relates to the treatment of hazardous waste and, in particular, to the use of a processing fluid additive for safely and effectively treating water-wet hogout propellant as well as any other water-wet propellants, explosives and hazardous wastes to make them compatible with the MSO (Molten Salt Oxidation) process.

2. Description of the Background

The dynamics of a smelt-water explosion may not be completely understood, but it has long been recognized that it is an event to be avoided. A black smelt explosion is caused by unevaporated water reacting with unburned residue or hot ash at the bottom of the boiler, says Esa Vakkilainen, senior research manager at recovery boiler specialist Andridz-Ahlasperon. For example, a black smelt boiler "explosion" closed Sodra Cell's Norwegian kraft pulp mill at Tofte in September 2000. This resulted in around 80,000 tons of softwood and eucalyptus pulp being lost from market production, affecting both suppliers and customers.

There have been efforts to prevent smelt explosions in kraft mills as above. This is reflected in U.S. Pat. Nos. 3,447,895 to Nelson et al., 4,106,978 to Nelson, 4,194,124 to Nutley et al., and 4,462,319 to Larsen. These patents suggest solutions in the form of (1) introduction of a liquid to rapidly cool the smelt bed (e.g. Nelson et al.), (2) introduction of a water-absorbing powder (e.g. Nelson, Larsen), and (3) irradiation of the smelt/water interface to create non-explosive nucleate boiling (e.g Nutley et al.).

As a result of the foregoing efforts, it is known that polyglycols (polyethylene glycol and polypropylene glycol) can help to prevent smelt-water explosions in kraft chemical recovery furnaces. The ability of polyethylene glycol or "PEG" to prevent smelt-water explosions is described in U.S. Pat. No. 3,447,895 Nelson et al. The '895 patent discloses a method of preventing explosions in kraft chemical recovery furnaces due to water leaking into the molten smelt in the furnace. An aqueous quenching solution of polymeric glycol (polyethylene glycol and polypropylene glycol) is introduced into the furnace to rapidly cool the smelt to safe temperatures without itself causing an explosion.

The risk of smelt explosion also arises in the context of MSO waste treatment. The Molten Salt Oxidation (MSO) process is a thermal, flameless process that has the inherent capability of completely destroying organic constituents of mixed wastes (chlorinated solvents, spent ion exchange resin), hazardous wastes (PCB-contaminated oils), and energetic materials. The MSO process is commonly used for treatment of water-wet propellant and explosive wastes that are typically generated when a propellant or an explosive is removed from its casing using a high pressure water jet. One example of this is hogout propellant. However, smelt-water explosions are also able to occur in high-temperature furnaces/reactor vessels during MSO waste treatment.

Thus, the ability of the polymeric glycols in preventing explosions in kraft chemical recovery furnaces would seemingly make them useful for the MSO process. However, the MSO process is quite different from that of a kraft chemical recovery furnace in that it is a chemical reaction process. The reactants, including solid, gas or liquid wastes concurrently with air, are introduced into a reaction medium, which is molten sodium carbonate or a blend of other salts at temperatures ranging from 700-1000 degrees Centigrade. The reaction medium may or may not enter the reaction, however, it serves as a host to generate combustion products and to facilitate or to catalyze the reaction between the oxygen in the incoming air and the combustion products. Therefore, the MSO process imposes a different set of requirements upon the reactants or feed streams than does a kraft chemical recovery furnace.

Consequently, it would be greatly advantageous to reduce/eliminate the potential for smelt-water explosions that are able to occur in high-temperature furnaces/reactor vessels during MSO by a process that employs polymeric glycol to prevent a smelt-water explosion due to the accumulation of dangerous levels of sodium chloride and/or sodium sulfide in the molten sodium carbonate in the MSO reactor vessel. Sodium chloride and sodium sulfide are known to create a highly explosive smelt in kraft chemical recovery furnaces.

SUMMARY OF THE INVENTION

Accordingly, it is an object of the present invention to provide a method for reducing/eliminating the potential for smelt-water explosions that are able to occur in high temperature furnaces/reactor vessels during MSO waste treatment by use of a particular polymeric glycol in a particular manner to prevent a smelt-water explosion due to the build up of sodium chloride and/or sodium sulfide in the molten sodium carbonate and the addition of water in the MSO reaction vessel.

It is another object to select a glycol for the process as described above that is uniquely-suited for MSO waste treatment, maximizing the desired combination of properties in the MSO context including water solubility, hygroscopicity, low volatility, thermal stability, good combustibility and clean burnout, low viscosity and lubricity, low toxicity and the ability to partition the energetic material to prevent massing.

According to the present invention, these and other objects are accomplished by a process for using polyethylene glycol (PEG) as a processing fluid additive for safely and effectively treating water-wet hogout propellant as well as any other water-wet propellants, explosives and hazardous wastes to make them compatible with the MSO process. The method includes the step of applying liquid PEG to the hazardous waste to create a slurry that when fed directly into the MSO reactor vessel prevents a smelt-water explosion due to the accumulation of dangerous levels of sodium chloride, and/or sodium sulfide, and water. The PEG possesses special qualities that make it ideal for this purpose. It is a low cost, low viscosity, commercially available, non-hazardous (per OSHA standards), water soluble, low toxicity chemical that burns cleanly leaving little or no residue. It also prevents the propellant residue from sticking back together thus facilitating a uniform feedstock that can be conveyed using a pump.

DETAILED DESCRIPTION OF THE PREFERRED EMBODIMENTS

The present invention is a processing fluid and method of using the same for safely and effectively treating water-wet hogout propellant as well as any other water-wet wastes using the MSO process.

Using the water-wet hogout propellant as an example, solid rocket propellant upon expiration of its service life is removed from the rocket motor casing by a high-pressure water jet. The resulting waste, referred to as "hogout propellant", typically contains a large excess of water. In order to prepare the hogout propellant for treating it using the MSO process the excess water is removed. However, it is not possible to remove 100 percent of the water from the hogout propellant in the dewatering process.

Feeding wastes containing liquid water into the molten carbonate bath used in the MSO process has the potential for a destructive "smelt-water" explosion. "Smelt-water" explosions are not completely understood, but they are known to be physical (i.e. flameless) explosions that result when water is converted supersonically into steam to produce a shock wave. Molten sodium carbonate by itself will not cause an explosion with water, but it will cause an explosion if it contains more than approximately 6 percent sodium chloride or about 12 percent sodium sulfide or a combination of sodium chloride and sodium sulfide. Sodium chloride, in particular, accumulates in the MSO salt bath due to the reaction of the sodium carbonate with the hydrogen chloride produced from the combustion products from the ammonium perchlorate (AP) oxidizer contained in the hogout propellant itself and in the residual water.

Figure 1:
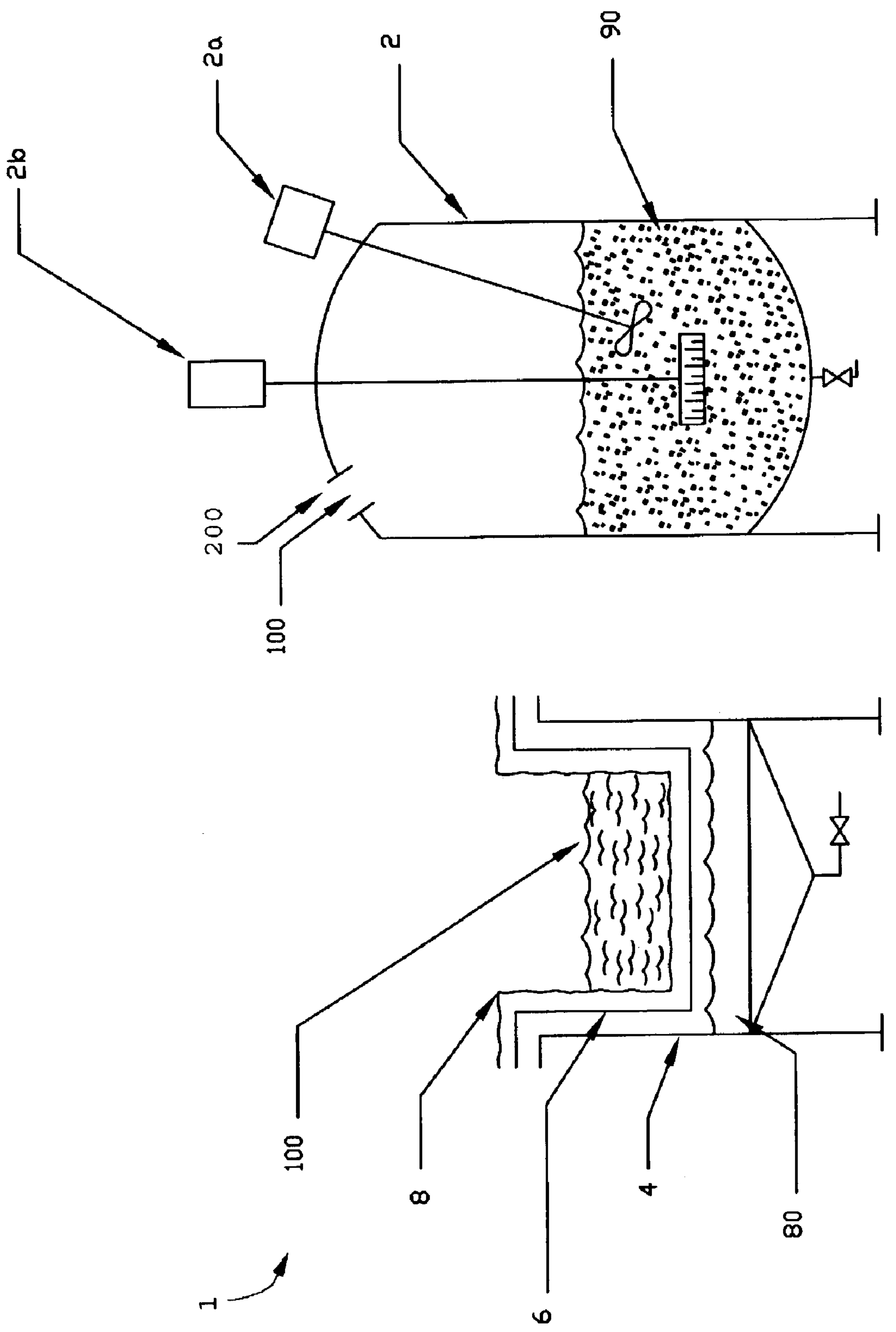
FIG. 1 illustrates a method and system for slurrying the water-wet hogout propellant using the PEG as a processing fluid additive.

Referring to FIG. 1, there is illustrated a system for MSO waste treatment using PEG to prevent a smelt-water explosion. The system includes an initial treatment station 1 for removing excess water from water-wet hogout to make it compatible with the MSO (Molten Salt Oxidation) process. Treatment station 1 comprises a liquid filter bag 8 fitted into a perforated stainless steel basket 6, which in turn is fitted into a stainless steel drainage tank 4. The water-wet hogout propellant 100 is placed into a 5-micron polyproylene liquid filter bag 8 which is fitted into a perforated stainless steel basket 6, which in turn is fitted into a stainless steel tank 4. By filtration down through the filter bag 8 and basket 6, excess water 80 is drained and removed. The dewatered hogout propellant 100 is then removed from the filter bag 8 and is transferred to a grinding vessel 2 for creating a slurry 90 according to the present invention.

As also seen in FIG. 1, the present invention adds a processing fluid 200 to vessel 2 through an inlet at the front end to prevent a "smelt-water" explosion during treatment of the hogout propellant 100 in the MSO process. The processing fluid 200 is added to vessel 2 for grinding and mixing the water-wet hogout propellant 100 with an agitator 2*a* and a homogenizer 2*b* to produce a slurry 90 for the MSO process.

The processing fluid 200, in particular, is polyethylene glycol, or "PEG". For example, PEG having an average molecular weight range of 380 to 420 (amw) and having the chemical formula, $H—(OCH_2CH_2)n—OH$ where n has an average value of 8.7 is suitable for use. The n average value may vary within a range of 4.1 to 13.2 for an average molecular weight range of 190 to 630 without detracting from the efficacy of the invention. PEGs in the molecular weight range from 190 to 630 are ideally suited as a carrier for both homogenizing (size reduction/slurrying) and feeding the ground hogout propellant 90 because they are liquids and have complete solubility with water in all proportions. Water solubility of the PEGs also facilitates the cleanup of equipment or environmental spills. The PEG is provided in liquid form because liquid PEG has a low toxicity. It is not a "Hazardous Chemical" as defined by the OSHA Hazard Communication Standard, 29 CFR 1910.1200. Liquid PEG forms an aqueous solution with water in all proportions.

The amount of liquid PEG 200 admitted to vessel 2 is controlled in accordance with the amount of residual water in the hogout propellant 100 to ensure a minimum concentration of 20 percent by weight PEG in the solution of water and PEG.

Once inside the grinding vessel 2, the PEG 200 acts as a humectant and tends to absorb water from the water-wet hogout propellant 100 during homogenization. Since water in the propellant makes the propellant difficult to burn, the displacement of the water improves the combustibility of the propellant in the MSO process.

Figure 2:
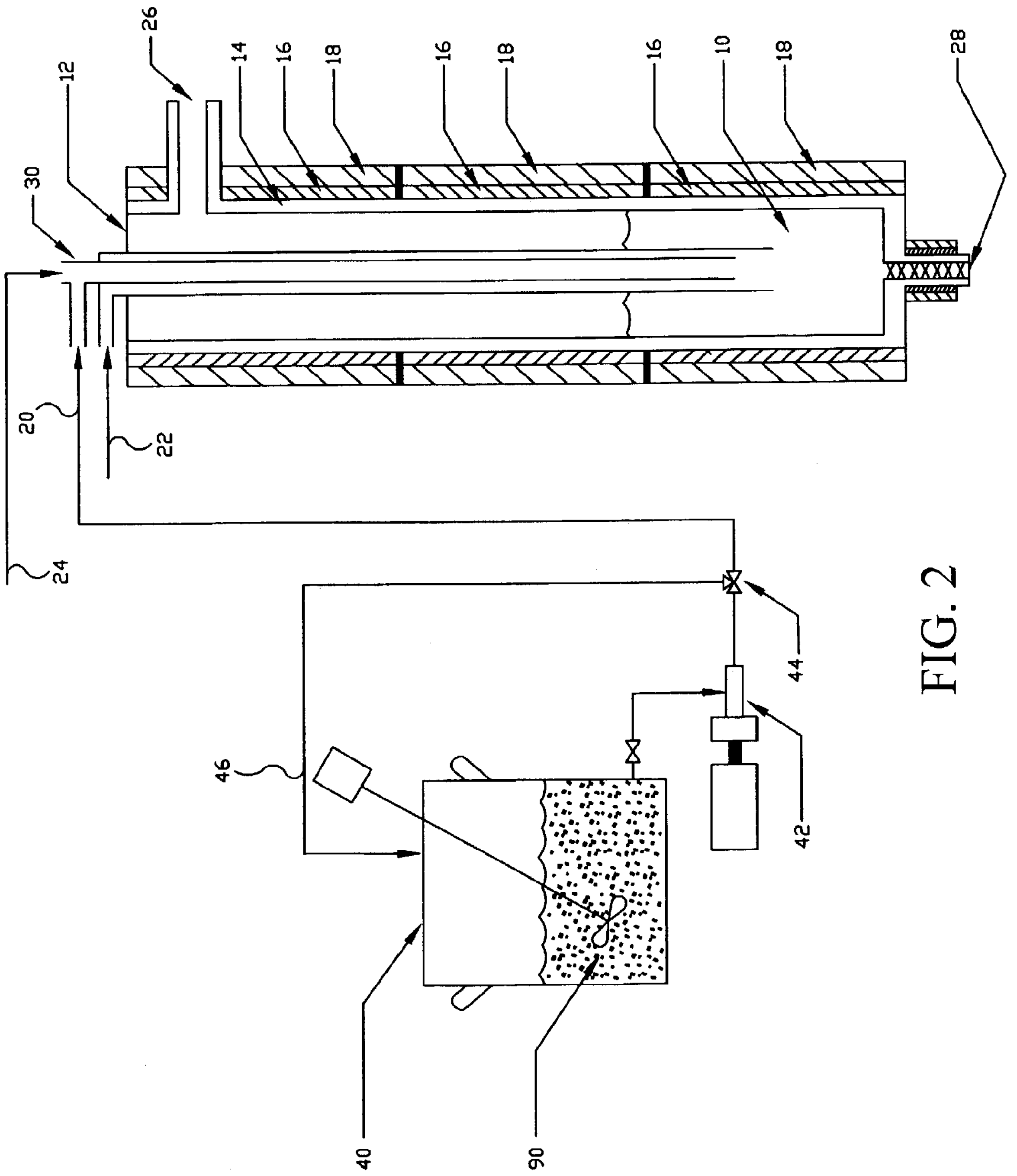
FIG. 2 illustrates a system for treating the foregoing slurry using the molten salt oxidation "MSO" process.

Referring to FIG. 2, there is illustrated an MSO reaction vessel 12, and a pumping system for introducing the foregoing slurry 90 from vessel 2 into MSO reaction vessel 12. After the water-wet hogout propellant 100 has been fully ground with homogenizer 2*b* and agitator 2*a* and the PEG 200, the slurry 90 is charged into a 5-gallon stainless steel stockpot 40. The pumping system transfers the slurry 90 from stockpot 40 into a molten sodium carbonate bath 10 via a downcomer 30 in a reaction vessel 12 having a wall 14 formed of a nickel-chromium alloy such as Inconel 600 or other suitable material, pairs of resistance heaters 16 and alumina-silica insulation 18. Downcomer 30 may be a conventional downcomer in which the feed is mixed with air.

The pumping system further comprises a positive displacement metering pump 42 which pumps the slurry 90 at a metered flow rate into the molten sodium carbonate bath 10 in the reaction vessel 12 via the downcomer 30 at inlet 20. When the flow of the slurry 90 to the reaction vessel 12 is shut off, it is recycled to the stockpot 40 via a 3-way valve 44 and return line 46. Air for atomization and oxidation are admitted respectively into the molten sodium carbonate bath 10 in the reaction vessel 12 at inlets 24 and 22 of the downcomer 30. Inlet 22 is used for the oxidizing air and inlet 24 is used for the atomizing air. The off-gas including $CO_2$, CO, $O_2$, $NO_x$ formed by the oxidation reaction, and $N_2$ are discharged at 26. Since the PEG has a low volatility and is thermally stable to approximately 300 degrees C., the PEG serves to carry the waste material into the molten sodium carbonate bath 10 before vaporizing or decomposing. Moreover, PEGs have lubricity and a low viscosity (depending on molecular weight have a viscosity at 210 degrees F. ranging from 4.3 to 10.8 centistokes). Thus, PEGs provide internal and external lubrication and facilitate the pumping of slurries of wastes in the PEGs using a positive displacement metering pump 10 such as the Seepex pump Model 0015-24 which has been certified for pumping propellants and explosives. Moreover, PEGs are noncorrosive to rubber thus do not cause the rubber binders used in propellants and explosives to swell or become sticky which is important for feeding. PEGs are inherently an anti-sticking agent that promotes homogenization of the hogout propellant for slurrying and pumping. It effectively partitions the slurried material and significantly slows settling in the process lines.

The molten salt bath 10 contained in the bottom of the reaction vessel 12 and into which the slurry waste is introduced can be of any known composition serving as a medium for treatment, and is typically an alkalai metal carbonate such as sodium carbonate, potassium carbonate or lithium carbonate, or mixtures thereof, e.g. a mixture of 50 percent $Na_2CO_3$ and 50 percent $K_2CO_3$, by weight; mixtures of alkali metal carbonate such as sodium carbonate and alkali metal chloride such as sodium chloride, e.g. 10 percent $Na_2CO_3$ and 90 percent NaCl, by weight and the like. For example, molten salt consisting of 100 percent molten sodium carbonate is contained in reaction vessel 12 at a temperature of about 900 degrees C.

The temperature of the molten salt bath 10 for carrying out the oxidation of the organic waste generally ranges from 870 degrees C. to 950 degrees C., e.g. ideally about 900 degrees C. and such temperature can be maintained by incorporating the molten salt reaction vessel 12 e.g. within pairs of electric resistance heaters 16 and alumina-silica insulation 18. A portion of the heat is generated by the oxidation reaction itself.

Sufficient air is fed concurrently with the waste, below the surface of the melt, to provide oxygen to assure complete carbon oxidation to carbon dioxide, which at 20 mole percent excess is 1.2 moles of air for every mole of carbon added. To maximize vessel life, the unit should be maintained at an operating temperature of about 900 degrees C. However, at temperatures exceeding about 950 degrees C. the reaction vessel 12 undergoes a rate of corrosion that greatly exceeds the normal rate of 0.015 inches per 1,000 hours at 950 degrees C. that has been reported. Furthermore, at temperatures exceeding 950 degrees C. the material properties of the nickel-chromium alloy material of the reaction vessel 12 are deteriorated resulting in a significant reduction in the material strength of the reaction vessel 12.

The PEGs contain oxygen (approximately 39 weight percent) to support the MSO combustion process in the reaction vessel 12. To provide additional oxygen dry air is injected at a feed rate ranging from 100 to 360 liters per minute concurrently with the waste feed stream via downcomer 30 into the molten salt bath 10. PEGs due to their chemical composition burn away completely and cleanly leaving virtually no residue (less than 0.05 percent). The low ash content of the PEGs should not contribute to residue buildup in the salt bath. It is desirable to have no buildup of ash in the salt bath from MSO processing.

During the combustion process the organic constituents of the waste materials are oxidized to carbon dioxide, carbon monoxide, oxides of nitrogen, and water. The inorganic products resulting from the reaction of the molten salt with the halogens, sulfur, phosphorous, metals, and radionuclides introduced into the salt bath results in the buildup of the inorganic products in the sodium carbonate. The excess buildup of these products in the carbonate salt can result in a reduction in the efficiency of the system and can generate a highly explosive melt. The carbonate salt serves both as a chemical reagent and as an acid scrubber to neutralize and to retain any acidic by-products produced during the waste destruction process. As the carbonate content in the salt decreases, the efficiency of the process decreases and the carbonate salt must be removed from the reaction vessel 12 via outlet 28 and replaced.

Throughout the homogenizing and treatment processes it is nearly impossible for an operator to avoid contact with the carrier in the processing of the hogout propellant and other wastes that would use the PEGs as a carrier. Nevertheless, in reaction vessel 12 the PEGs pose no health hazards to the user. PEG is not a "Hazardous Chemical" as defined by the OSHA Hazard Communication Standard, 29 CFR 1910.1200. It is therefore essential that the carrier have a low toxicity. Also, the PEGs are not hazardous to the environment.

In light of the foregoing it should be apparent that the PEG processing fluid 200 and method of using the same in the context of the MSO process will prevent a "smelt-water" explosion. However, it should also be apparent that the key properties discussed above make the PEGs suitable for the MSO process because the MSO process is different from that of a kraft chemical recovery furnace and because of this, other properties are required for suitability as an adjuvant for processing of wastes such as the hogout propellant. No other polymers are known that possess this combination of key properties.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the following claims.

We claim:

1. A method for scavenging hydrogen sulfide and/or mercaptans from a liquid or gaseous stream which comprises bringing the stream into contact with a scavenging effective amount of at least one scavenger selected from the group consisting of:

(i.) a 1,3,5-trisalkanylamino hexahydro-1,3,5-triazine derivative of the formula:

(II)

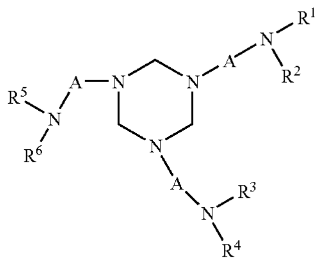

wherein each A is independently selected from the formula —$(CHR^7)_x$ wherein x is from 1 to about 6 and each $R^1$, $R^2$, $R^3$, $R^4$, $R^5$, $R^6$ and $R^7$ is independently selected from —H or a $C_1$-$C_6$ alkyl;

(ii.) a nitrogen heterocyclic compound of the formula: e (I)

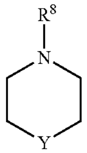

wherein Y is —N or —O and $R^8$ is 2-aminoethyl or 2-hydroxyethyl; and (iii.) an amine oxide of the formula $(RCONHCH_2CH_2CH_2)(CH_3)_2N \rightarrow O$ wherein R is a radical selected from the group consisting of decyl, cocoyl, lauryl, cetyl and oleyl and thereby scavenging hydrogen sulfide and/or mercaptan from the liquid or gaseous stream.

2. The method of claim 1, wherein the at least one scavenger is the 1,3,5-trisalkanylamino hexahydro-1,3,5-triazine derivative.

3. The method of claim 2, wherein the 1,3,5-trisalkanylamino hexahydro-1,3,5-triazine derivative is 1,3,5-tris[3-(dimethylamino)propyl] hexahydro-1,3,5-triazine, 1,3,5-tris[2-(dimethylamino)ethyl] hexahydro-1,3,5-triazine, 1,3,5-tris[3-(diethylamino)propyl] hexahydro-1,3,5-triazine or 1,3,5-tris[2-(diethylamino)ethyl] hexahydro-1,3,5-triazine.

4. The method of claim 1, wherein the at least one scavenger comprises the nitrogen heterocyclic compound (ii).

5. The method of claim 1, wherein the at least one scavenger is an amine oxide of formula (iii).

6. A method for scavenging hydrogen sulfide and/or mercaptan contaminants from a hydrocarbon stream, comprising mixing the hydrocarbon stream with a scavenging effective amount of at least one scavenger selected from the group consisting of a:

(i.) 1,3,5-trisalkanylamino hexahydro-1,3,5-triazine derivative of the formula:

(I)

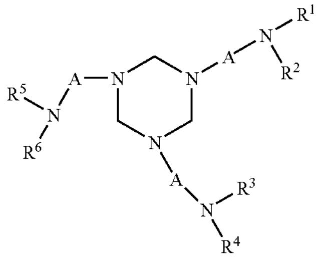

wherein each A is independently selected from the formula $—(CHR^7)_x$ wherein x is from 1 to about 6 and each $R^1$, $R^2$, $R^3$, $R^4$, $R^5$, $R^6$ and $R^7$ is independently selected from —H or a $C_1$-$C_6$ alkyl;

(ii.) nitrogen heterocyclic compound of the formula:

(II)

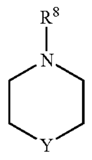

wherein Y is —N or —O and $R^8$ is 2-aminoethyl or 2-hydroxyethyl; and (iii.) amine oxide of the formula $(RCONHCH_2CH_2CH_2)(CH_3)_2N \rightarrow O$ wherein R is a radical selected from the group consisting of decyl, cocoyl, lauryl, cetyl and oleyl and thereby scavenging hydrogen sulfide and/or mercaptan contaminants from the hydrocarbon stream.

7. The method of claim 6, wherein the at least one scavenger comprises a 1,3,5-trisalkanylamino hexahydro-1,3,5-triazine derivative selected from the group consisting of 1,3,5-tris[3-(dimethylamino)propyl] hexahydro-1,3,5-triazine, 1,3,5-tris[2-(dimethylamino)ethyl] hexahydro-1,3,5-triazine, 1,3,5-tris[3-(diethylamino)propyl] hexahydro-1,3,5-triazine and 1,3,5-tris[2-(diethylamino)ethyl]hexahydro-1,3,5-triazine.

8. The method of claim 6, wherein the at least one scavenger comprises an amine oxide of formula (iii).

9. The method of claim 1, wherein the liquid or gaseous stream is selected from the group consisting of liquefied petroleum gas, crude oil, petroleum residual oil and heating oil.

10. A method for scavenging hydrogen sulfide and/or mercaptans from a liquid stream which comprises bringing the stream into contact with a scavenging effective amount of at least one scavenger selected from the group consisting of a:

(i.) 1,3,5-trisalkanylamino hexahydro-1,3,5-triazine derivative of the formula:

(II)

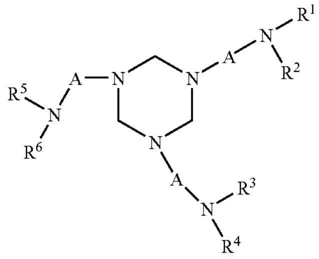

wherein each A is independently selected from the formula $—(CHR^7)_x$ wherein x is from 1 to about 6 and each $R^1$, $R^2$, $R^3$, $R^4$, $R^5$, $R^6$ and $R^7$ is independently selected from —H or a $C_1$-$C_6$ alkyl;

(ii.) a nitrogen heterocyclic compound of the formula:

(I)

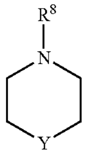

wherein Y is —N or —O and $R^8$ is is 2-aminoethyl or 2-hydroxyethyl; and (iii.) an amine oxide of the formula $(RCONHCH_2CH_2CH_2)(CH_3)_2N \rightarrow O$ wherein R is a radical selected from the group consisting of decyl, cocoyl, lauryl, cetyl and oleyl and thereby scavenging hydrogen sulfide and/or mercaptans from the liquid or gaseous stream wherein the scavenger is added neat or diluted with a solvent selected from the group consisting of alcohols, esters, benzene, benzene derivatives, acetone, kerosene and aromatic naphtha.

11. The method of claim 4, wherein $R^1$ is 2-aminoethyl.

12. The method of claim 4, wherein $R^1$ is 2-hydroxyethyl.

13. The method of claim 6, wherein the hydrocarbon is selected from the group consisting of liquefied petroleum gas, crude oil, petroleum residual oil and heating oil.

14. The method of claim 6, wherein the at least one scavenger comprises the nitrogen heterocyclic compound of (ii).

15. The method of claim 1, wherein the method is conducted at a temperature between from about 40° C. to about 150° C.

16. The method of claim 15, wherein the method is conducted at a temperature of about 85° C. to 120° C.

17. The method of claim 1, wherein the liquid or gaseous stream is a wet or dry gaseous mixture of hydrogen sulfide and/or mercaptan and hydrocarbon vapors.

18. The method of claim 1, wherein the at least one scavenger is vaporized and then introduced as a gas to the liquid or gaseous stream.

* * * * *